United States Patent
Cortes et al.

(10) Patent No.: US 10,283,013 B2
(45) Date of Patent: May 7, 2019

(54) SYSTEM AND METHOD FOR LANGUAGE LEARNING THROUGH FILM

(71) Applicant: Mango IP Holdings, LLC, Farmington Hills, MI (US)

(72) Inventors: Kimberly Cortes, Allen Park, MI (US); Jason Teshuba, Huntington Woods, MI (US); Michael Teshuba, West Bloomfield, MI (US); Ryan Whalen, West Bloomfield, MI (US); Michael Goulas, Commerce Township, MI (US); Anthony Ciannamea, San Francisco, CA (US); Lilia Mouma, Athens (GR)

(73) Assignee: Mango IP Holdings, LLC, Farmington Hills, MI (US)

( * ) Notice: Subject to any disclaimer, the term of this patent is extended or adjusted under 35 U.S.C. 154(b) by 570 days.

(21) Appl. No.: 14/890,492

(22) PCT Filed: May 13, 2014

(86) PCT No.: PCT/US2014/037812
§ 371 (c)(1),
(2) Date: Nov. 11, 2015

(87) PCT Pub. No.: WO2014/186346
PCT Pub. Date: Nov. 20, 2014

(65) Prior Publication Data
US 2016/0133154 A1 May 12, 2016

Related U.S. Application Data

(60) Provisional application No. 61/822,720, filed on May 13, 2013.

(51) Int. Cl.
G09B 19/06 (2006.01)
G09B 5/06 (2006.01)
G09B 5/00 (2006.01)

(52) U.S. Cl.
CPC ............... G09B 19/06 (2013.01); G09B 5/00 (2013.01); G09B 5/065 (2013.01)

(58) Field of Classification Search
CPC ........... G09B 19/06; G09B 5/00; G09B 5/065
(Continued)

(56) References Cited

U.S. PATENT DOCUMENTS

| 5,882,202 A * | 3/1999 | Sameth | G09B 19/06 434/157 |
| 6,418,271 B1 * | 7/2002 | Cookson | G09B 5/04 348/E5.111 |

(Continued)

FOREIGN PATENT DOCUMENTS

KR 20090116546 A 11/2009

OTHER PUBLICATIONS

CNNez YBM Sisa T&E (http://magazine.ybmsisa.com/business/business02_01.asp)YBM Sisa T&E discloses a computerized English learning software program utilizing CNN news clips. This software enables a user to choose multiple modes: Watching mode, Repeating mode, Recording mode and Dictation mode. Also, this software has Phonetic pop-ups, Quiz and Voice Comparison features.

(Continued)

*Primary Examiner* — Eddy Saint-Vil
(74) *Attorney, Agent, or Firm* — Endurance Law Group PLC

(57) ABSTRACT

A computer-assisted system and method for foreign language instruction. A motion picture having audio dialog in a target language is stored, in a computer-readable form, with chapter divisions, scene subdivisions and dialog sequence sub-subdivisions. In an Engage Mode, the motion picture is played on a display screen sequence-by-sequence, scene-by-scene, and chapter-by-chapter for a student listen- (Continued)

ing to the audio dialog on a speaker. Interlinear target and source language subtitles are provided with interactive capabilities accessed through cursor movement or other means. The interlinear subtitles may be semantically color-mapped. After selecting a scene to view, the student is progressed through a series of modules that break-down and dissect each dialog sequence of the scene. The student studies each dialog sequence before moving to the next scene. Likewise, all scenes in a chapter are studied before moving to the next chapter and ultimately completing the motion picture.

15 Claims, 10 Drawing Sheets

(58) Field of Classification Search
    USPC .......................................................... 434/157
    See application file for complete search history.

(56) References Cited

U.S. PATENT DOCUMENTS

| | | | | |
|---|---|---|---|---|
| 7,096,416 | B1* | 8/2006 | Smith | G06F 17/241 |
| | | | | 715/203 |
| 7,117,231 | B2* | 10/2006 | Fischer | H04N 21/235 |
| 7,818,164 | B2 | 10/2010 | Wood et al. | |
| 7,991,801 | B2 | 8/2011 | Chen et al. | |
| 8,005,666 | B2 | 8/2011 | Goto et al. | |
| 8,529,264 | B2* | 9/2013 | Hamlin | G09B 5/06 |
| | | | | 434/157 |
| 2004/0015360 | A1 | 1/2004 | Calabrese | |
| 2004/0067042 | A1* | 4/2004 | Hughes, Jr. | G11B 27/105 |
| | | | | 386/261 |
| 2004/0081434 | A1* | 4/2004 | Jung | G11B 27/10 |
| | | | | 386/244 |
| 2004/0152054 | A1 | 8/2004 | Gleissner et al. | |
| 2004/0152055 | A1 | 8/2004 | Gleissner et al. | |
| 2004/0248068 | A1 | 12/2004 | Davidovich | |
| 2005/0053359 | A1* | 3/2005 | Jung | G11B 27/105 |
| | | | | 386/234 |
| 2005/0193322 | A1* | 9/2005 | Lamkin | G06F 17/30056 |
| | | | | 715/202 |
| 2006/0098936 | A1* | 5/2006 | Ikeda | G11B 20/00159 |
| | | | | 386/201 |
| 2006/0183087 | A1 | 8/2006 | Gleissner et al. | |
| 2006/0183089 | A1 | 8/2006 | Gleissner et al. | |
| 2007/0172199 | A1* | 7/2007 | Kobayashi | G11B 27/034 |
| | | | | 386/241 |
| 2008/0008450 | A1* | 1/2008 | Ikeda | G11B 27/105 |
| | | | | 386/336 |
| 2008/0059145 | A1 | 3/2008 | Wood et al. | |
| 2008/0085099 | A1* | 4/2008 | Guihot | G11B 27/10 |
| | | | | 386/201 |
| 2008/0115148 | A1* | 5/2008 | Paila | H04H 60/13 |
| | | | | 719/316 |
| 2008/0281579 | A1 | 11/2008 | Tsukiji et al. | |
| 2008/0284910 | A1 | 11/2008 | Erskine et al. | |
| 2008/0286730 | A1 | 11/2008 | Romero, Jr. | |
| 2008/0286731 | A1 | 11/2008 | Rolstone | |
| 2009/0023119 | A1 | 1/2009 | Breidner | |
| 2009/0034784 | A1* | 2/2009 | McQuaide, Jr. | G06F 17/30834 |
| | | | | 382/100 |
| 2009/0066722 | A1* | 3/2009 | Kriger | G06Q 30/02 |
| | | | | 345/619 |
| 2009/0083288 | A1 | 3/2009 | LeDain et al. | |
| 2009/0175596 | A1 | 7/2009 | Hirai | |
| 2009/0191519 | A1* | 7/2009 | Wakamoto | G09B 5/04 |
| | | | | 434/157 |
| 2010/0098389 | A1* | 4/2010 | Shimada | G11B 27/105 |
| | | | | 386/278 |
| 2010/0158475 | A1* | 6/2010 | Sporer | G03B 31/04 |
| | | | | 386/205 |
| 2010/0159425 | A1* | 6/2010 | Hamlin | G09B 5/06 |
| | | | | 434/169 |
| 2010/0272417 | A1* | 10/2010 | Nagasawa | H04N 19/597 |
| | | | | 386/341 |
| 2010/0332214 | A1* | 12/2010 | Shpalter | G06F 17/2854 |
| | | | | 704/2 |
| 2011/0020774 | A1 | 1/2011 | Nguyen | |
| 2011/0059422 | A1 | 3/2011 | Masaoka | |
| 2011/0211815 | A1* | 9/2011 | Yamashita | H04N 13/0029 |
| | | | | 386/353 |
| 2011/0246173 | A1 | 10/2011 | Li et al. | |
| 2012/0021389 | A1 | 1/2012 | Wakamoto | |
| 2012/0060093 | A1 | 3/2012 | Lee | |
| 2012/0115112 | A1 | 5/2012 | Purushotma et al. | |
| 2012/0156659 | A1 | 6/2012 | Yun | |
| 2012/0275761 | A1 | 11/2012 | Li et al. | |
| 2012/0276504 | A1 | 11/2012 | Chen et al. | |
| 2013/0177891 | A1 | 7/2013 | Hammerschmidt | |
| 2013/0196292 | A1 | 8/2013 | Brennen et al. | |
| 2013/0216202 | A1* | 8/2013 | Palakshamurthy | H04N 9/8233 |
| | | | | 386/241 |
| 2013/0295534 | A1 | 11/2013 | Meiri | |

OTHER PUBLICATIONS

超字幕 Sourcenext Corp. (http://www.sourcenext.com/product/chj/pc/function/)Sourcenext Corp. discloses an English learning software platform utilizing famous movies (as shown right). This software can display dual language subtitles (i.e., home and target language) at the same.

* cited by examiner

SYSTEM AND METHOD FOR LANGUAGE LEARNING THROUGH FILM

CROSS REFERENCE TO RELATED APPLICATIONS

This application claims priority to U.S. Provisional Patent Application No. 61/822,720 filed May 13, 2013, the entire disclosure of which is hereby incorporated by reference and relied upon.

BACKGROUND OF THE INVENTION

Field of the Invention

The invention relates generally to methods and systems for foreign language learning, and more particularly to a computer-assisted method and system incorporating interactive motion picture subtitles to train a person fluent in a source language to understand a different target language.

Description of Related Art

Learning one or more foreign languages is an increasingly important skill in the expanding global economy. In seeking to improve teaching practices, teachers and researchers have sought various methods in search of improved efficacy. Popular approaches have included: the Direct method (a/k/a the natural method); the Series method; Communicative language teaching; Language immersion; the Silent Way; the Natural Approach; Total Physical Response; Teaching Proficiency through Reading and Storytelling; Dogme; Pimsleur method; Michel Thomas Method; and Learning by Teaching, to name but a few.

Computerized learning methods have become increasingly popular. Despite the rich interactive content incorporated into most computerized methods of foreign language instruction, learning a foreign language remains a difficult and painful task.

Efforts have been made to make foreign language learning less stodgy and tedious. Several more recent attempts have attempted to leverage the use of subtitles in films, television broadcasts or other audio-visual works (collectively "motion pictures") created in the target language. A motion picture can be defined loosely as any recorded production containing a video portion and a synchronized audio dialog portion in a target language. Such attempts include, for example, an English learning software platform utilizing famous films offered by Sourcenext Corp. (Tokyo, Japan). This software can concurrently display dual language subtitles (i.e., source and target languages). Subtitles are displayed in blocks or fragments of dialog, and the user can skip to or repeat sections of dialog by clicking on the desired subtitle block. The meaning of words in the subtitle can be researched using a dictionary look-up feature (in a different window) while watching the movie. In another example, CNNez YBM Sisa T&E (Korea) purportedly offers a computerized English learning software program utilizing standard televised CNN news clips. All of these examples utilize subtitles in motion pictures created in a target language to make the language learning experience more enjoyable and more culturally relevant.

Generally stated, when script that accompanies a video or motion picture production is translated and made into subtitles, it is common practice to then sync the subtitle text with the audio dialog as it naturally accompanies the visual content. The practice of subtitling films predates the incorporation of synchronized audio dialogue (known as "talking pictures", or "talkies"). There are two types of subtitles, hard (or open) and soft (or closed) subtitles. Hard subtitles are encoded into the original material and cannot be turned off by the viewer. Soft subtitles are mixed to the video from another data file, and can usually be turned on/off or selected by the viewer. Soft subtitles (also known as softsubs or closed subtitles) are separate instructions, usually a specially marked up text with time stamps to be displayed during playback. In supported player systems, it is possible to have multiple concurrent language subtitles.

The prior art attempts to increase the ease with which a student learns a foreign language by leveraging concurrent subtitles in motion pictures still struggle to achieve efficacy. Students of such programs are generally better engaged, but still experience difficulty processing information and committing new information to memory. Accordingly, many methods of teaching languages have been developed over the years. Some methods have fallen into relative obscurity and others are still widely used. Notwithstanding, there is a continuing desire to discover new and effective ways to teach people a foreign language, with a new-found interest in the use of subtitles in motion pictures. Improvements are therefore needed to perfect these newer techniques and adapt them for use in computerized formats.

BRIEF SUMMARY OF THE INVENTION

According to a first aspect of this invention, a computer-assisted method for instruction in language skills to train a student fluent in a source language to understand a different target language. The method comprises the steps of: providing a graphic user interface including a display screen and an audio speaker and a means for moving a cursor within the display screen, providing a motion picture containing a video portion and a corresponding audio dialog portion in a target language, the motion picture having a playing time, dividing the playing time into a plurality of chapters, subdividing at least one chapter into a plurality of scenes, sub-subdividing at least one scene into a plurality of dialog sequence segments, associating target language subtitles with the motion picture, the target language subtitles being generally synchronized with the audio dialog portion, making at least one word in the target language subtitle interactive with a student in direct response to a selection made on the display screen, associating source language subtitles with the motion picture, the source language subtitles generally synchronized with the audio dialog portion, presenting at least one chapter of the motion picture on the display screen and playing the corresponding audio dialog portion in the target language through the audio speaker. The step of presenting the chapter includes selecting a first scene within the chapter, and then for the first selected scene performing the steps of: activating a scene preparation module, the step of activating the scene preparation module comprising displaying on the display screen a plurality of target language vocabulary words contained within the target language subtitles in the scene, at least one of the target language vocabulary words being electronically interactive in direct response to a selection made on the display screen, and de-activating the scene preparation module, activating a view scene module following the step of de-activating the scene preparation module, the step of activating the view scene module includes presenting the entire scene of the chapter of the motion picture on the display screen and playing the corresponding audio dialog portion in the target language through the audio speaker, and then de-activating the view scene module, activating a scene follow-up module following the step of de-activating the view scene module, the step of activating the scene follow-up module including selecting a first dialog sequence segment sub-subdivided from the scene, the step of selecting a first dialog sequence segment including replaying the first dialog sequence of the scene of the chapter of the motion picture on the display screen and playing the corresponding audio dialog portion in the target language through the audio speaker, the step of replaying the first dialog sequence further including displaying on the display screen the target language subtitle, at least one of the words in the target language subtitle being electronically interactive in direct response to a selection made on the display screen, selecting another dialog sequence segment sub-subdivided from the scene, the step of selecting another dialog sequence segment including replaying the another dialog sequence of the scene of the chapter of the motion picture on the display screen and playing the corresponding audio dialog portion in the target language through the audio speaker, the step of replaying the another dialog sequence further including displaying on the display screen the target language subtitle, at least one of the words in the target language subtitle being electronically interactive in direct response to a selection made on the display screen, repeating the steps of selecting and replaying another dialog sequence segment with all remaining dialog sequence segments in the scene, and then de-activating the scene follow-up module.

According to another aspect of this invention, a computer-assisted system for instruction in language skills to train a student fluent in a source language to understand a different target language. The system comprises: a graphic user interface including a display screen and an audio speaker and a means for moving a cursor within the display screen, a motion picture containing a video portion and a corresponding audio dialog portion in a target language stored in a computer-readable medium, the motion picture having a playing time divided into a plurality of chapters, at least one chapter subdivided into a plurality of scenes, each scene sub-subdivided into a plurality of dialog sequence segments, a non-transitory computer readable medium operatively associated with the graphic user interface and the motion picture, the non-transitory computer readable medium coded with instructions and executed by a processor to perform the steps of: associating target language subtitles with the motion picture, the target language subtitles being generally synchronized with the audio dialog portion, making at least one word in the target language subtitle interactive with a student in direct response to a selection made on the display screen, associating source language subtitles with the motion picture, the source language subtitles generally synchronized with the audio dialog portion, presenting at least one chapter of the motion picture on the display screen and playing the corresponding audio dialog portion in the target language through the audio speaker. The step of presenting the chapter includes selecting a first scene within the chapter, and then for the first selected scene performing the steps of: activating a scene preparation module, the step of activating the scene preparation module comprising displaying on the display screen a plurality of target language vocabulary words from the scene, at least one of the target language vocabulary words being electronically interactive in direct response to a selection made on the display screen, and de-activating the scene preparation module, activating a view scene module following the step of de-activating the scene preparation module, the step of activating the view scene module comprising presenting the entire scene of the chapter of the motion picture on the display screen and playing the corresponding audio dialog portion in the target language through the audio speaker, and then de-activating the view scene module, activating a scene follow-up module following the step of de-activating the view scene module, the step of activating the scene follow-up module including selecting a first dialog sequence segment sub-subdivided from the scene, the step of selecting a first dialog sequence segment including replaying the first dialog sequence of the scene of the chapter of the motion picture on the display screen and playing the corresponding audio dialog portion in the target language through the audio speaker, the step of replaying the first dialog sequence further including displaying on the display screen the target language subtitle, at least one of the words in the target language subtitle being electronically interactive in direct response to a selection made on the display screen, selecting another dialog sequence segment sub-subdivided from the scene, the step of selecting another dialog sequence segment including replaying the another dialog sequence of the scene of the chapter of the motion picture on the display screen and playing the corresponding audio dialog portion in the target language through the audio speaker, the step of replaying the another dialog sequence further including displaying on the display screen the target language subtitle, at least one of the words in the target language subtitle being electronically interactive in direct response to a selection made on the display screen, repeating the steps of selecting and replaying another dialog sequence segment with all remaining dialog sequence segments in the scene, and then de-activating the scene follow-up module.

This invention substantially increases the ease and effectiveness with which a student learns a foreign language through the strategic use of motion pictures and concurrent target language subtitles in a computerized format.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 2A is an enlarged view of the area circumscribed at 2A in FIG. 2 showing a scene sub-subdivided into a plurality of dialog sequences;

DETAILED DESCRIPTION OF THE INVENTION

Referring to the figures, wherein like numerals indicate like or corresponding parts throughout the several views, the present invention pertains to a computerized system and a computer-assisted method for instruction in language skills to train a person, hereafter referred to as the student 20. The student 20 is presumed reasonably fluent in a source language, say for example English, and wishes to learn or to become better acquainted with a different target language, say for example Spanish or Mandarin Chinese.

Figure 1:
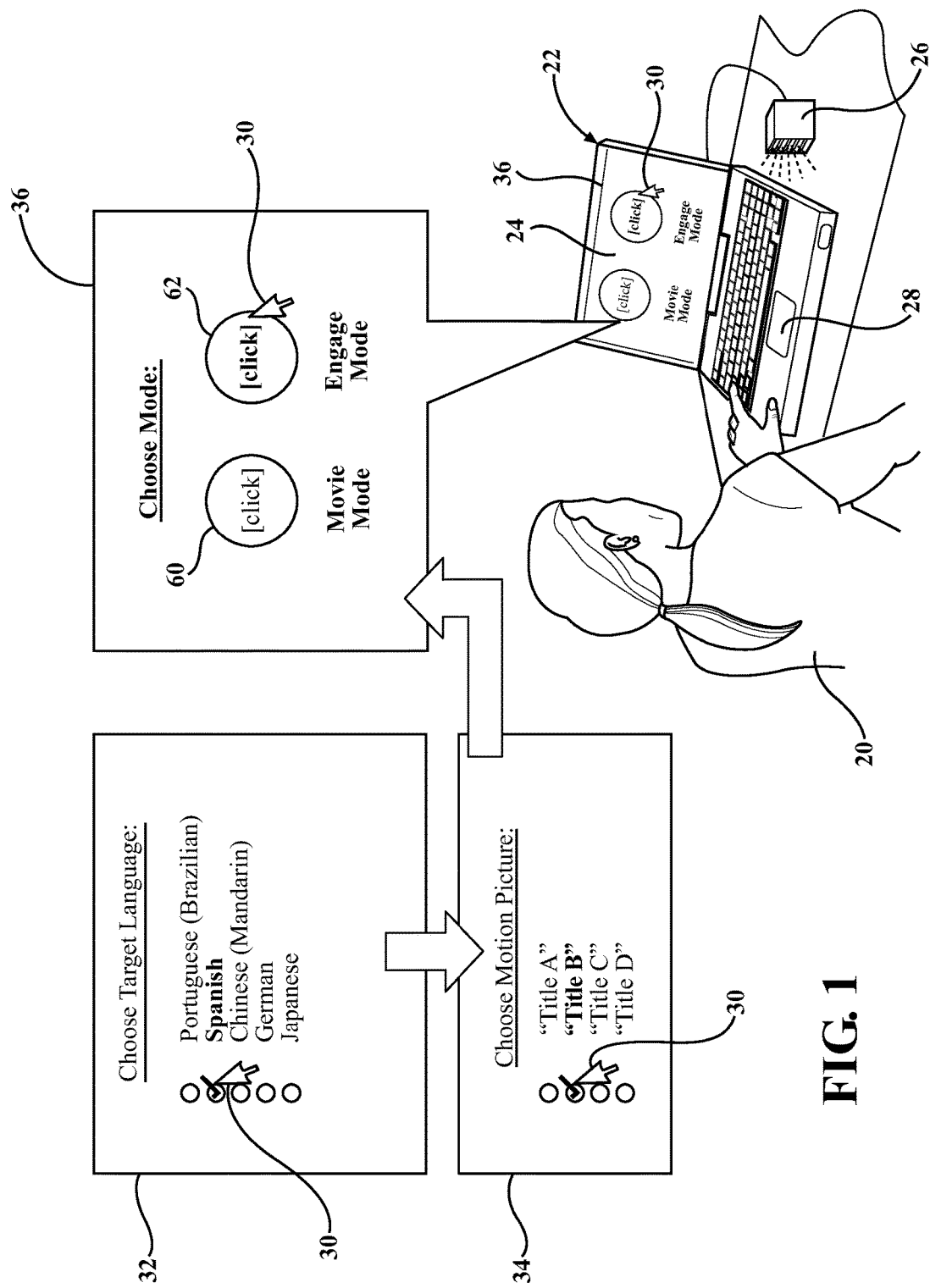
FIG. 1 is highly simplified representation of a student learning a foreign language in a computerized format according to one embodiment of the present invention.

FIG. 1 shows, in a highly simplified way, the student 20 interacting with a computer 22. While the computer 22 here is shown as a personal laptop type device, it will be understood that the computer 22 could, with equal ease, be a netbook, a desktop computer, a handheld personal computing device like a tablet or smartphone, a gaming system like Play Station or Xbox, a suitably enabled television, a smart board in a classroom setting, or any other type of platform capable of carrying out the methods and features of this invention. Thus, in any form, the computer 22 will include a graphic user interface that includes a display screen 24 and some form of audio speaker 26 and some form of means 28 for making a selection presented on the display screen 24. In the illustrated example, the means 28 for making a selection is shown as a simple touch pad below the computer keyboard that controls movement of a cursor 30 across the display screen 24. However, it will be appreciated that in alternative embodiments the means 28 could be a mouse device, a trackball device, a software application responsive to voice commands or eye movements or other human command techniques. The audio speaker 26 may of course be any suitable type including, but not limited to personal headphones and the like.

The computer 22 is operatively associated with a non-transitory computer readable medium. This association can be direct, such as via a local hard drive and memory, or remote as in via an internet connection. Other association types may be readily contemplated by those of skill in the art, or may be developed in the future which will provide similar functionality to those briefly mentioned here. The computer readable medium is thus operatively associated with the graphic user interface as well as with a motion picture stored in electronic format. The non-transitory computer readable medium is coded with instructions and executed by a processor to perform the steps of this invention, which include teaching a foreign language in a computerized format.

The means 28 for making a selection presented on the display screen 24 enables the student 20 to navigate the computer system and methods of this invention. For examples, in FIG. 1 three successive screens 32, 34, 36 are shown as might be displayed (one at a time) on the display screen 24. In the first screen 32, the student 20 is presented with selection choice to represent their target language. Again, the target language is the language that the student 20 wishes to study. As, in this example, the screens 32-36 are depicted in English, it must be presumed the source language has already been established as English. The student selects, by way of manipulating the cursor 30, Spanish as the target language.

In new screen 34, the student 20 is presented with the choice of four motion pictures (Titles A-D). As used herein, the term "motion picture" is intended to broadly define and encompass any type of film, television broadcast or other audio-visual work created in the target language. Motion picture is therefore broadly defined as any recorded production containing a video portion and a synchronized audio dialog portion in the target language (or at least where the dialog is predominantly in the target language). The term dialog includes conversation between two or more people acting or appearing in the motion picture, a single person speaking or signing to themselves, character voice-over events, narration, and all other forms of human speech associated with a motion picture by its creator(s). Preferably, although by no means necessarily, the offered motion pictures will be of relatively recent production and content rich in local customs and present-day life depictions in the culture of the people that fluently speak the target language. In this example, four different motion picture Titles A-D are electronically accessible to the student 20 via the computer 22. The student 20 selects Title B. MPAA ratings or other parental guide information is preferably associated with each title so that a content suitable to the student 20 may be selected. A parental rating 37 may be displayed on the screen 24, as show in FIG. 3.

Figure 2:
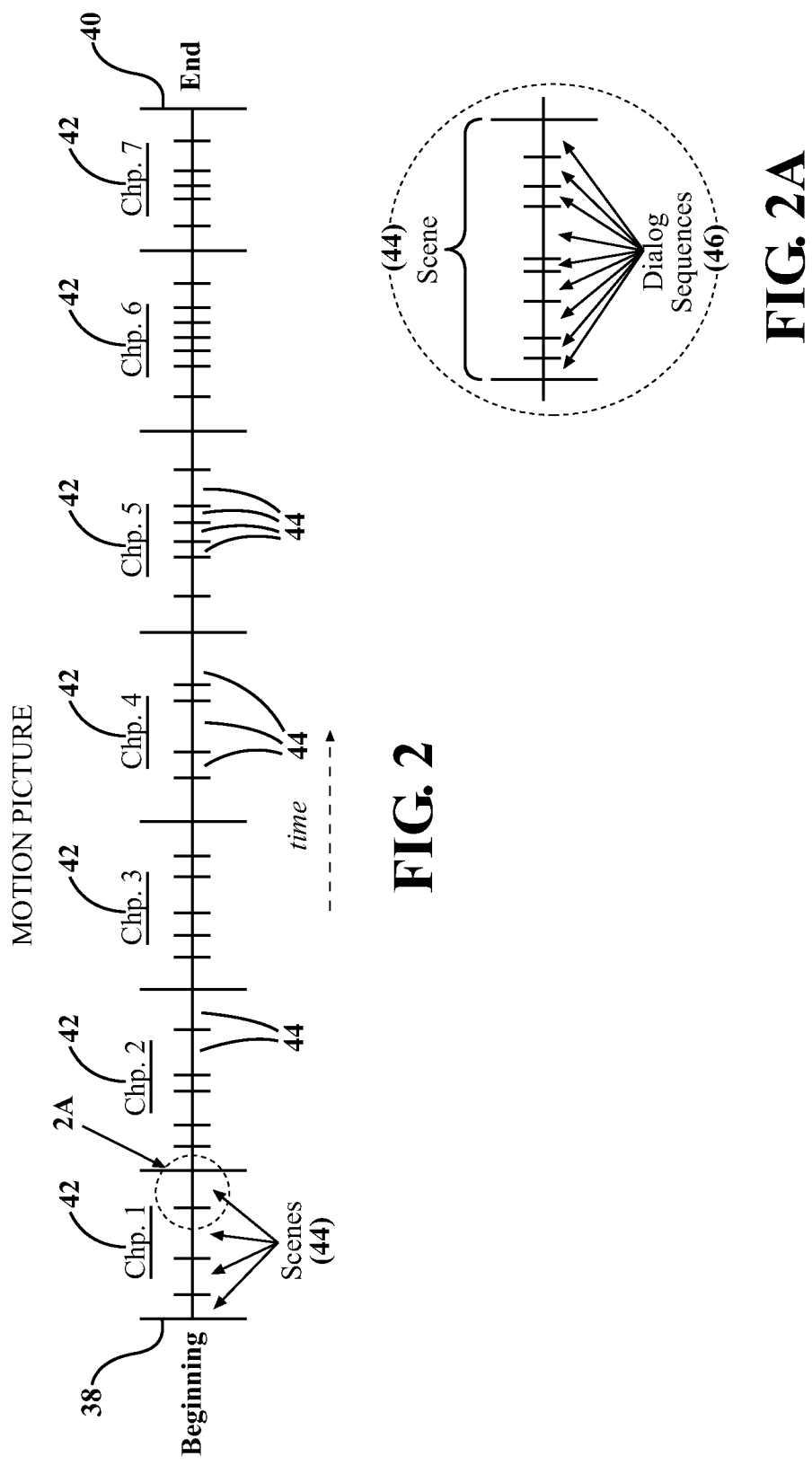
FIG. 2 is a timeline depiction of a motion picture showing chapter divisions and scene subdivisions.

FIG. 2 is a graphical time-line style representation of a motion picture shown having a beginning 38 and an end 40. The time span between beginning 38 and end 40 comprises the playing time of the motion picture. The playing time is preferably in the 1-2 hour range, however could be substantially shorter or longer. Whenever the playing time of a motion picture is more than about 15 minutes in length, it is convenient to divide the playing time of the motion picture into a plurality of consecutive chapters 42. This is shown graphically in FIG. 2, where the exemplary motion picture is divided into seven (7) chapters 42. The length (in time) of the chapters 42 need not be equivalent. Rather, a program linguist will preferably determine chapter 42 breaks at natural points in the story of the motion picture. At least one, but normally all, chapters 42 are subdivided into a plurality of consecutive scenes 44. The length (in time) of the scenes 44 also need not be the same. The linguist will determine scene 44 breaks at natural places within the chapter 42. Preferably, each scene 42 comprises about 1-15 minutes of playing time, and more preferably still about 5 minutes of playing time. As shown in FIG. 2A, each scene 44 is further sub-subdivided into a plurality of (at least two) consecutive dialog sequence segments 46. Again, the dialog sequences 46 may be of unequal length as determined by a program linguist to span natural short sections of the target language dialog. In this manner, the motion picture is stored in electronic format and made accessible to the computer 22 so that its video portion presents on the display screen while its synchronized audio portion (with dialog in the target language) presents through the speaker 26 in customary movie viewing fashion. Of course, some special sot-length applications, such as a music video or a very short length motion picture, might not be divided into multiple chapters or even multiples for that matter.

Figure 3:
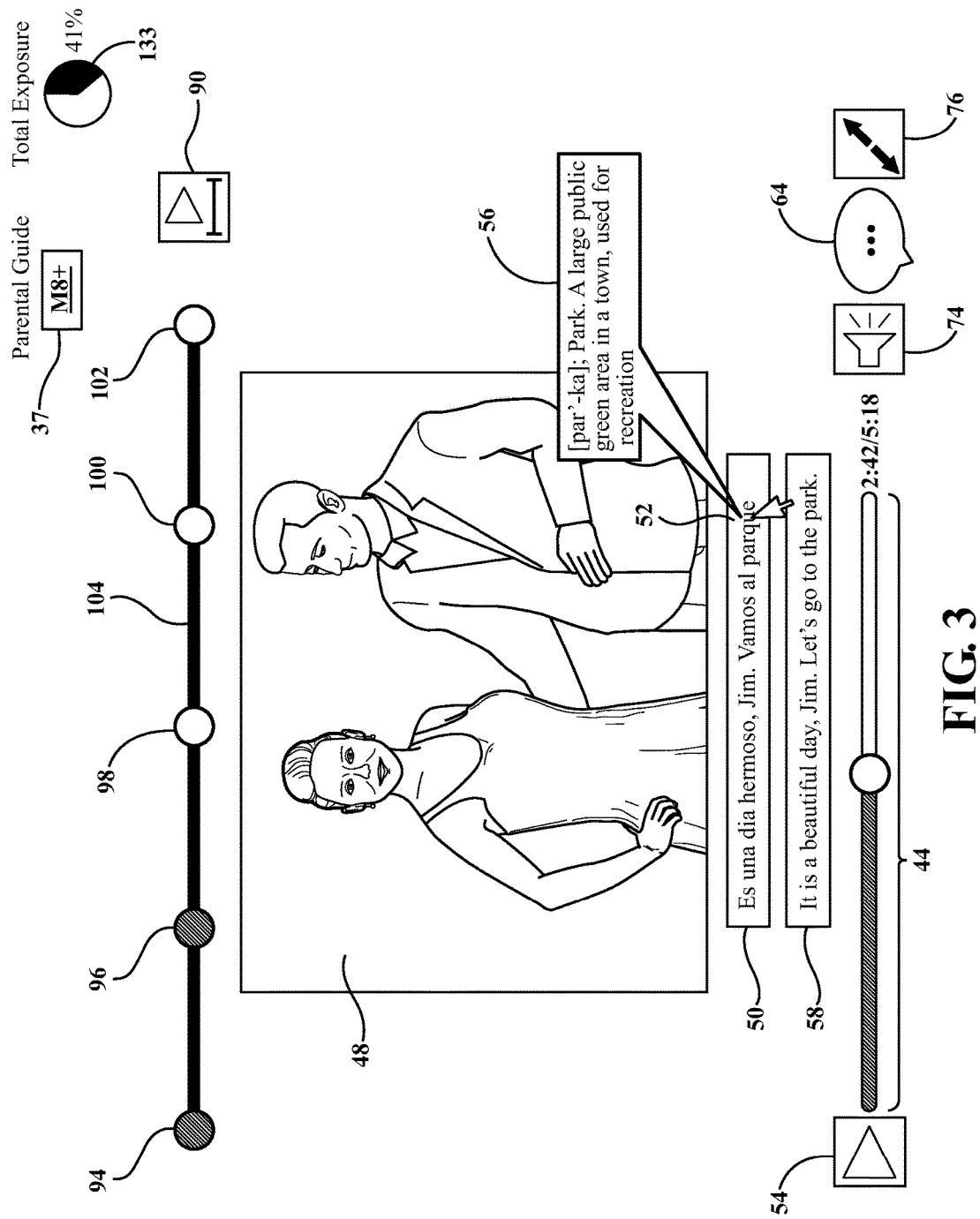
FIG. 3 is an exemplary screen shot during the view scene module showing the video portion of the motion picture together with subtitles in target and source languages and other features of the invention.

According to the methods of this invention, subtitles in the target language are added, embedded or otherwise associated with the motion picture and generally synchronized with the audio dialog portion. Thus in the example of FIG. 3, when in the video portion 48 of the motion picture an actor is seen speaking in the target language the dialog "Es una día hermoso, Jim. Vamos al parque.", the corresponding audio dialog is played through the speaker 26 and concurrently written in a target language subtitle 50 displayed on the display screen 24—typically under video presentation 48. In the preferred embodiment, the student 20 may selectively deactivate the target language subtitle 50 so that it does not appear on the display screen 24. At least one word 52 in the target language subtitle 50, and indeed preferably most or all of the words, are made interactive. The interactive feature may be available only when the motion picture is paused, such as by clicking a toggle-style playback control button 54. All of the words 52 made interactive will render a pop-up window 56. Contained within the pop-up window 56 is a phonetic equivalent in the target language. In the example of FIG. 3, at least the word "parque" 52 is made interactive. By hovering the cursor 30 over the word 52, its phonetic equivalent in the target language (in this case "[par'-ka]") appears in the pop-up window 56, along with a translation of the word into the source language (here "Park"). A dictionary-style definition may (optionally) also be included in the pop-up window 56 (rendered in FIG. 3 as the phrase "A large public green area in a town, used for recreation."). In addition, further interactive features may be enabled by more user input actions, such as by clicking on the word 52 with the cursor 30, an audio voice recording of the word 52 spoken in the target language will sound through the speaker 26, it being understood that the audio voice recording will have been previously stored in electronic format for ready access by the computer 22 via the non-transitory computer readable medium in direct response to the student's input selection. Other interactive inputs may be programmed to yield for the student 20 the target language case of the word 52, the target language gender of the word 52, the target language formality of the word 52, and so forth.

Source language subtitles 58 may likewise be added to, embedded with or otherwise associated with the motion picture so that the source language subtitles 58 are generally synchronized with the audio dialog portion and with the appearance of the target language subtitles 50.

Returning to FIG. 1, in the third screen 36, the student 20 is presented with a choice between Movie Mode 60 and Engage Mode 62. Modes 60, 62 represent different language learning processes, as will be described more fully below. In Movie Mode 60, the student 20 watches the entire motion picture from beginning to end with their choice of subtitles: in the source language 58, in the target language 50, both or none. If the student 20 selects "both", an invitation is extended to activate an optional color mapping feature that will described in greater detail below. In typical motion picture fashion, the audio dialog portion in the target language is played through the audio speaker 26 synchronized with the video portion 48. For a complete learning experience, however, the student 20 will select the Engage Mode 62 where the motion picture is broken down part-by-part. The student 20 selects Engage Mode 62.

Figure 4:
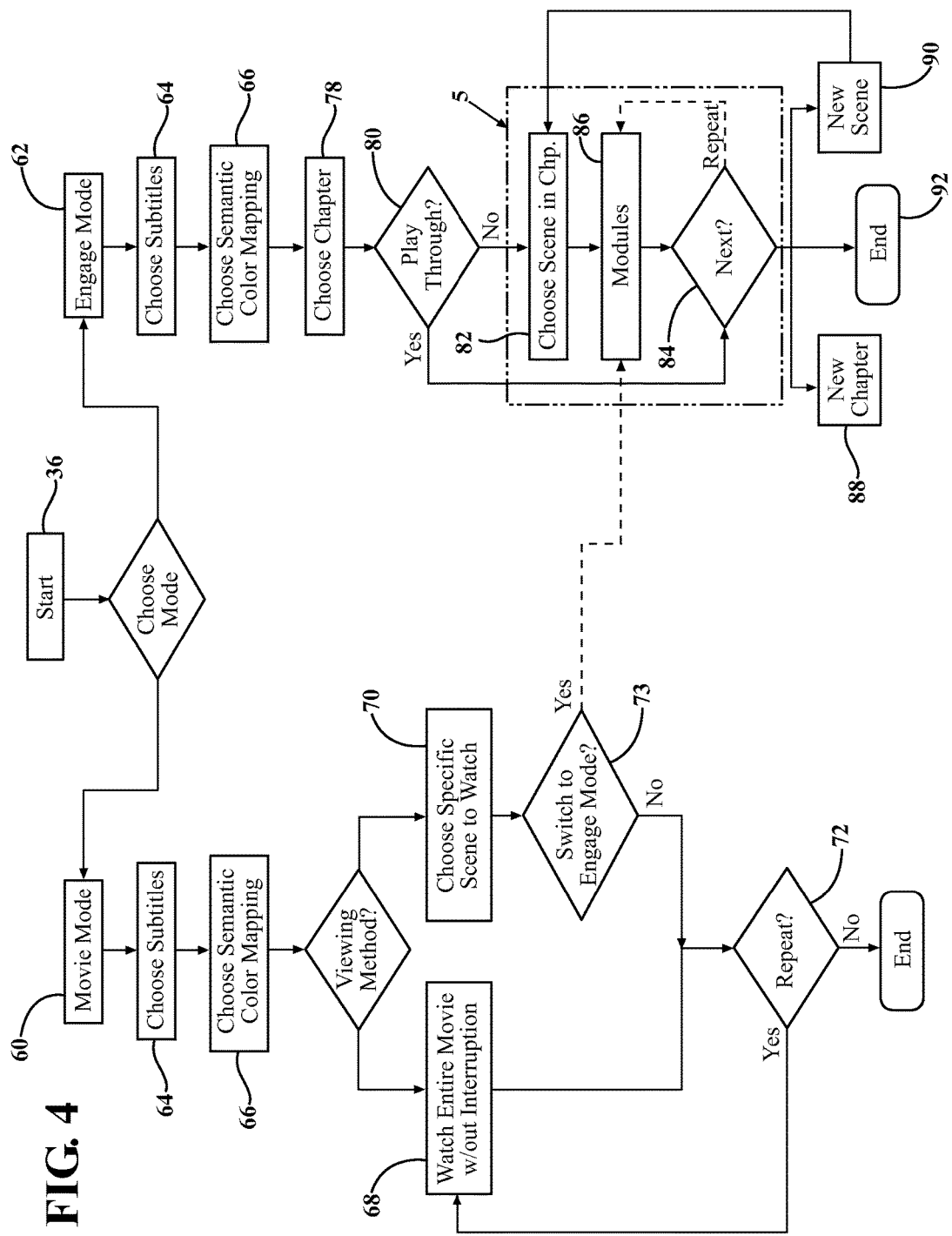
FIG. 4 is a diagrammatic flow chart depicting the overall language learning process according to one embodiment of the present invention.

FIG. 4 is a simplified, overall schematic diagram showing the general steps carried out by the present invention. The "Start" box at the top corresponds generally to the third screen 36 as shown in FIG. 1 where the student 20 is presented with a choice between Movie Mode 60 and Engage Mode 62.

When the student 20 selects the Movie Mode 60, he/she is invited to choose subtitle display options (target language 50, source language 58, both or neither) at action step 64. If the student 20 selects "both", they are invited to active a semantic color mapping feature at action step 66. When activated, semantic color mapping 66 demonstrates the meaning and word structure for the target language subtitle 50 by color-correlating it to the source language subtitle 58. Preferable, each distinct word or word group in the target language subtitle 50 will be assigned a distinct color by a program application operating through the computer readable medium. The word or words that mean the same in the source language subtitle 58 are presented in the same color. Thus, words of the same color will mean the same thing. Returning to the example of FIG. 3, the word "parque" 52 in the target language subtitle 50 may be colored pink. In this instance, parque 52 will be the only word in the entire target language subtitle 50 to be colored pink. In the source language subtitle 58, the corresponding word "park" will also be exclusively displayed in pink color. Thus, without activating the interactive pop-up window 56, the student 20 can intuitively appreciate that the target language word "parque" means "park" in the source language. Preferably, all words in the subtitles 50, 58 will be likewise semantically color-mapped. After the student 20 has made the subtitle selections, a query is made whether to watch the entire motion picture from beginning 38 to end 40 without interruption (selection box 68), or to jump directly to a specific scene 44 (via selection box 70). If the student 20 chooses selection box 68, they will watch the motion picture on the display screen 24 while the corresponding audio portion is played through the speaker 26. After the conclusion of the motion picture, the student 20 is queried whether to repeat or end at decision box 72. By jumping to a specific scene 44 (selection box 70), the student has the option to switch to Engage Mode 62 at junction 73.

When instead the student 20 selects the Engage Mode 62, they are invited to choose subtitle display options 64 and 66 in substantially the same manner as in the Movie Mode 60 described above. As shown in FIG. 3, an icon 64 may be made available on the display screen 24 during later viewing sessions to enable the student 20 to change the subtitle selections at a later convenient time. Along with the subtitle icon 64, other conveniently located icons may include volume control 74, full screen control 76 and of course others.

Returning to FIG. 4, after the student 20 has made the subtitle selections, a query is made to choose a specific chapter 42 (via selection box 78). Normally, it would be expected that the student 20 choose Chapter 1 in order to start at the beginning 38 of the motion picture. However, the student 20 may instead wish to skip to a different chapter 42 in the motion picture. Decision box 80 queries the student 20 whether to play through the selected chapter 42, or instead choose a specific scene 44 within the chapter 42 at selection box 82. If the student 20 selects "play through" they will watch the selected chapter 42 on the display screen 24 while the corresponding audio portion is played through the speaker 26. After the conclusion of the selected chapter 42, the student 20 is queried (at decision block 84) whether to repeat the selected chapter 42 in the modules feature 86, or select a new chapter (selection box 88), select a specific scene 44 to replay (selection box 90) or end the program (decision box 92). If, the student chooses the "no" option for "Play Through" 80, they will be taken to selection box 94 where they are invited to select a specific scene 44 in the chapter 42. Again, normally, it is expected the student 20 will choose the first scene 44 in order to start at the beginning of the chapter 42. However, the student 20 may instead wish to skip to a different scene 44 in the chapter 42. The aforementioned step of presenting the chapter 42 thus includes selecting a scene 44 within the chapter 42. Once the scene 44 is selected, the student 20 is lead through a series of modules 86, which will be described in greater detail below. After completing the modules 86, the student 20 is queried (at decision block 84) whether to repeat the selected scene 44 in the modules feature 86, or select a new chapter (selection box 88), select a specific scene 44 to replay (selection box 90) or end the program (decision box 92).

Figure 5:
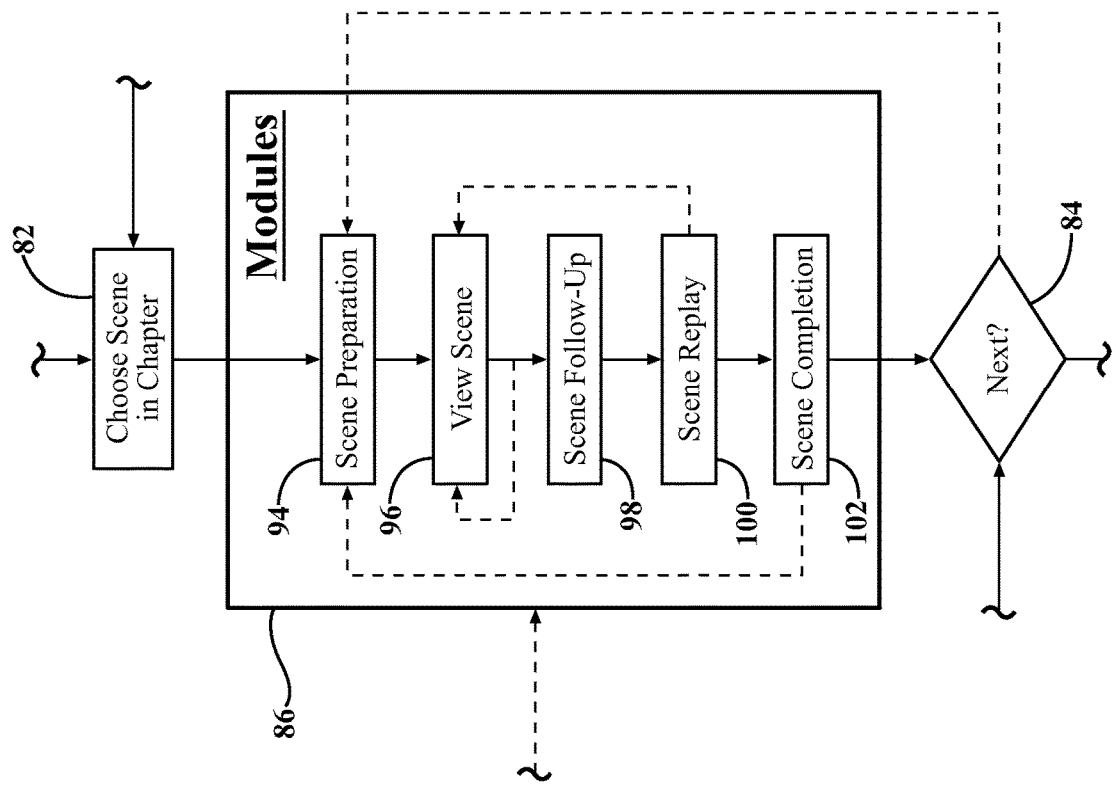
FIG. 5 is an enlarged view of the area indicated at 5 in FIG. 4 showing in greater detail the module features of the present invention.

FIG. 5 is an enlarged, or expanded, view of the region bounded by the rectangular broken lines indicated at 5 in FIG. 4. In particular, the modules feature 86 is here expanded to show more clearly that, in the preferred embodiment, a series of sequential steps or modules in the learning process when a student 20 watches the film in "Engage Mode" 62. These modules include: a scene preparation module 94, a view scene module 96, a scene follow-up module 98, a scene re-play module 100, and a scene completion module 102. Each of these modules 94-102 will be separately explained below. It is also helpful to note that, as shown in FIG. 3, a ticker bar 104 may be provided in the application programming to show progress as the student 20 moves through the modules 94-102 of a particular scene 44. As illustrated, the ticker bar 104 is positioned along the top of the screen 24, however other locations on and around the screen, or placement within auto-hiding side bars and such, are contemplated.

Figure 6:
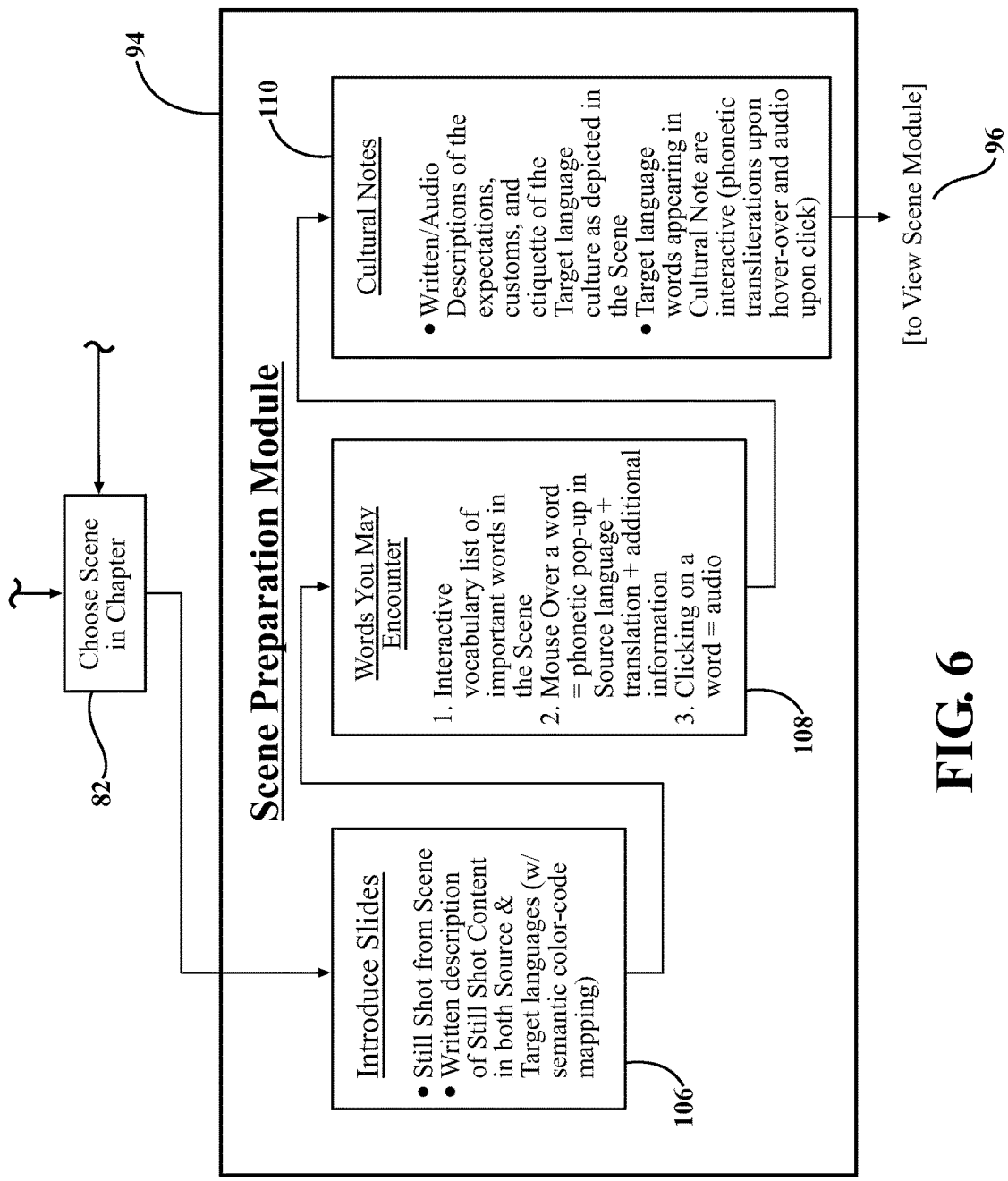
FIG. 6 is a detailed view of the scene preparation module.

Turning next to FIG. 6, the scene preparation module 94 is shown in detail. The step of selecting a scene 44 includes activating the scene preparation module 94, which in turn comprises displaying on the display screen 24 at least one still shot image capture from the selected scene 44. The purpose of this first step, referred to in FIG. 6 as Introduce Slides box 106, within the scene preparation module 94 is to prepare the student 20 for what he/she is about to learn in the selected scene 44. The still shot image(s) provides the student 20 with a high-level overview of what will happen in the selected scene 44. Notes written in the source language (e.g., English in this example), as well as in the target language (Spanish in this example) may be provided with the one or more still images, with color mapping to indicate the translations. The notes form descriptions of the content that is depicted in the still shot. Semantic color mapping and interactive phonetics properties may be incorporated into the text of these notes.

Following the Introduce Slides 106 step, the student is presented with a Words You May Encounter 108 screen. The Words You May Encounter screen 108 is, in effect, a list of relevant vocabulary words taken from among the target language subtitles 50 contained within the selected scene 44. The vocabulary words are interactive, meaning that if the user hovers their cursor 30 over the word, a phonetic pop-up in the target language will appear. Clicking on the word provides a pre-recorded or computer-generated audio narration, as well as the source language translation and any additional information associated with the word (e.g., case, formality, gender, etc.) For example, English does not contain grammatical formality as Spanish does. This is an example of the type of information that is often lost in translation or difficult to teach, but which becomes easy to learn through the principles of this present invention. Any foreign words incorporated in the "Culture Note" show phonetic transliterations upon hovering the cursor 30, and audio when clicked on.

Following the Words You May Encounter screen 108, the student is directed to a Cultural Notes screen 110. Cultural learning is considered an important component of learning a new language. In this screen 110, the student 20 can read all of the prepared Cultural Notes that are incorporated into the following scene. Having completed all three screens or steps 106-110 in the scene preparation module 94, the scene preparation module 94 is de-activated and the student 20 moves on to the view scene module 96.

Figure 7:
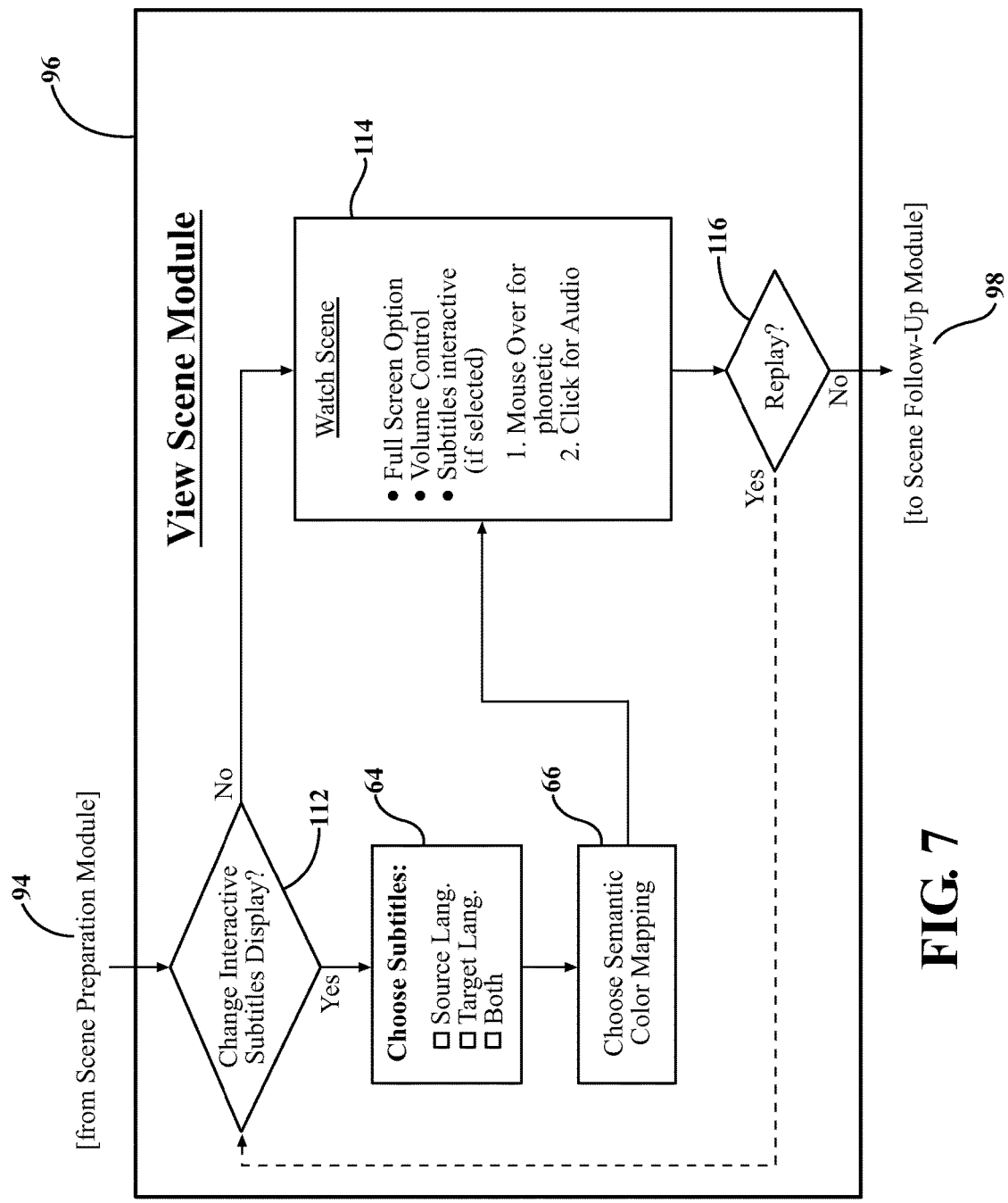
FIG. 7 is a detailed view of the view scene module.

The view scene module 96 is shown in detail in FIG. 7. The step of selecting a scene 44 further includes activating the view scene module 96 following the step of de-activating the scene preparation module 94. It should be noted that with careful selection of motion picture titles, the computerized invention will provide as much entertainment product as it does a language and culture-learning product. Care should be taken to select titles that users will actually want to watch and that are best suited for language/culture learning.

Activating the view scene module 96 begins with another query 112 to the student whether or not they wish to change the previously established (via similar action boxes 64 and 66) interactive subtitle display settings. As a reminder, these interactive setting include the student's 20 choice of source language 58, target language 50, both and neither. When both subtitles 50, 58 are selected, the student can choose to visually correlate both target 50 and source 58 subtitles by the above-described color-coded semantic mapping technique. For a beginning student 20 in the target language, having both language subtitles 50, 58 mapped with semantic color mapping is typically the best setting choice. Conversely, an advanced student 20 may want to follow along with only target language subtitles 50 to practice his/her reading abilities in the language she/he is learning, to understand the connection, to understand the slang, and/or to simply understand what are film characters are saying.

The student next proceeds to the Watch Scene step 114. This stage is depicted in FIG. 3, where the full screen 76 and volume control 74 can be readily accessed through the interactive display screen 24. Upon actuating the playback control button 54 (FIG. 3), the entire scene 44 of the chapter 42 of the motion picture is presented on the display screen 24 while the audio dialog portion is played in the target language through the audio speaker 26 in synchronized fashion. The student watches this presentation. If interactive subtitles have been selected, they will appear and provide interactive capabilities as described above. When finished, the student 20 is given the choice of replaying the entire scene 44, via decision block 116, or continuing to the next module. When the student chooses to replay, they are transported back to the decision block 112 and proceed from that point forward. On the other hand, if they choose to proceed, the view scene module 96 is de-activated.

Figure 8:
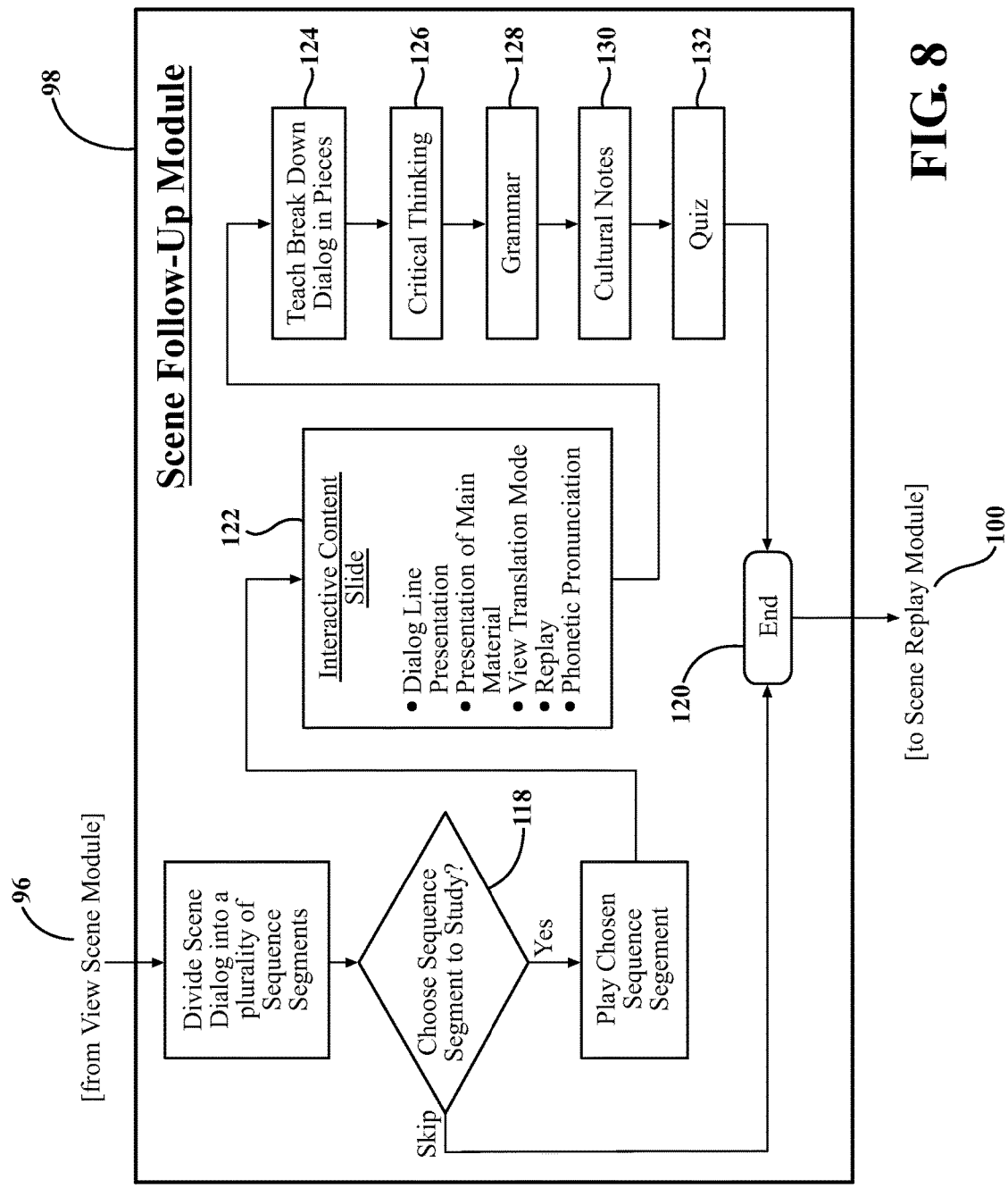
FIG. 8 is a detailed view of the scene follow-up module.
Figure 9:
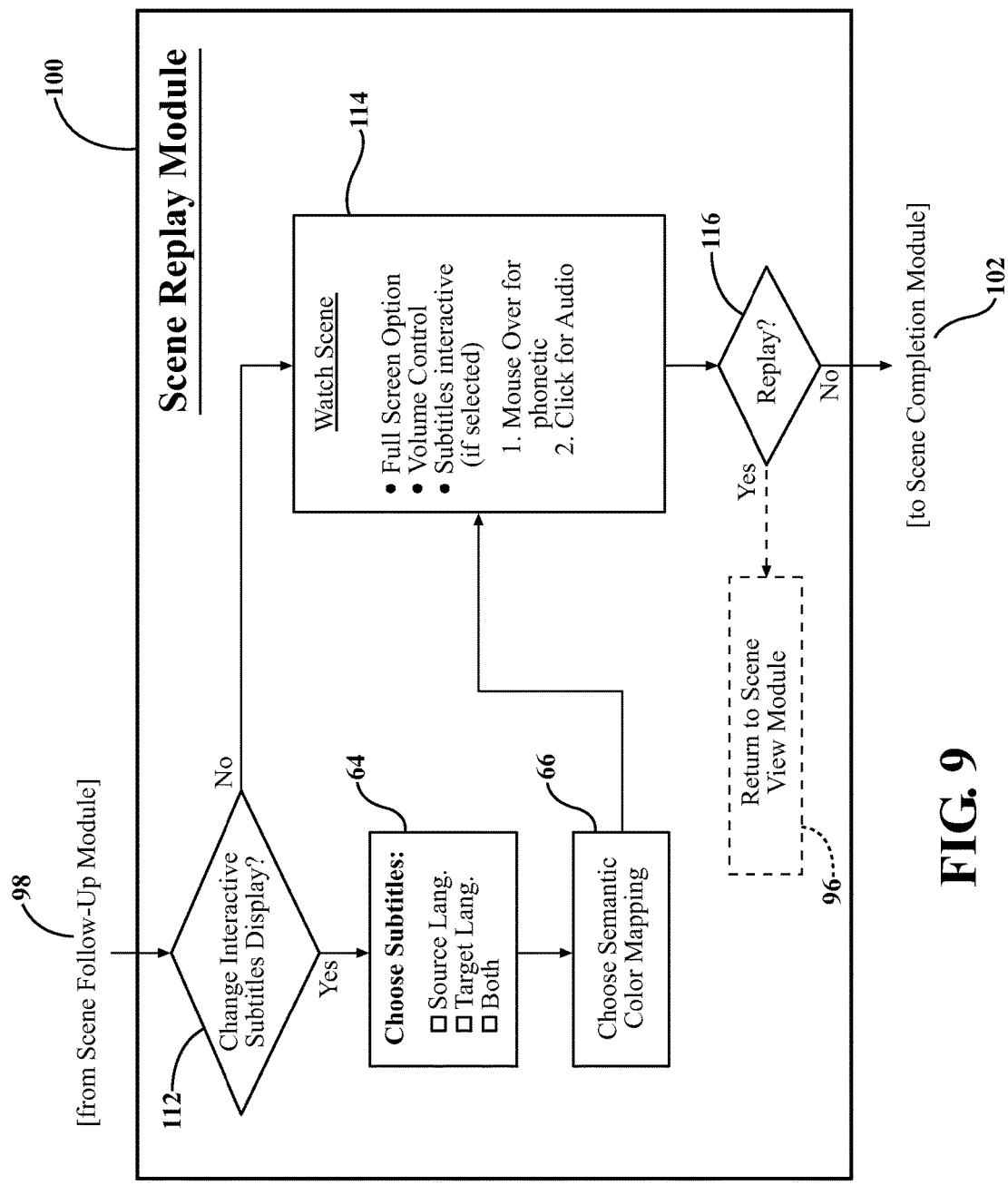
FIG. 9 is a detailed view of the scene replay module.
Figure 10:
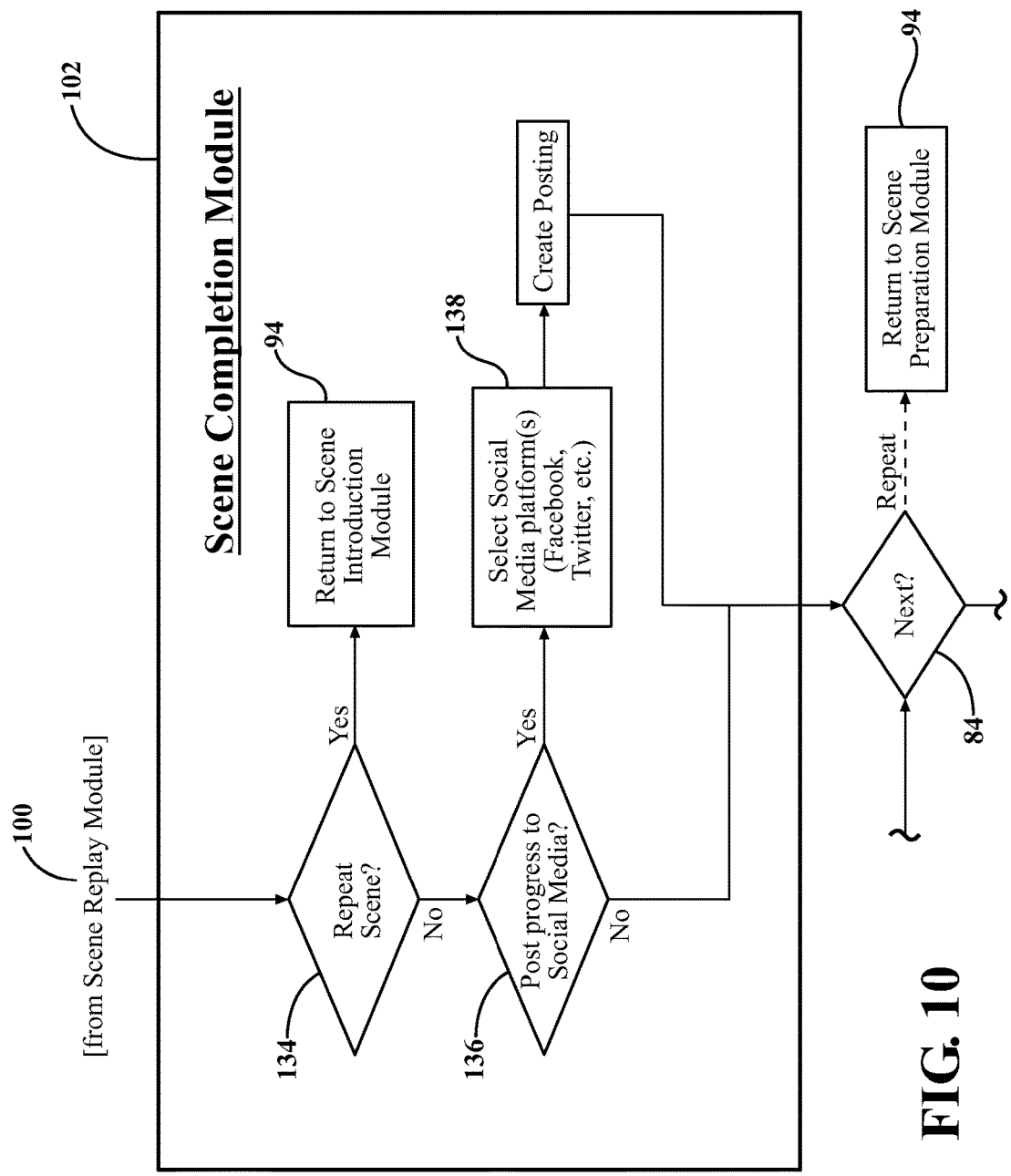
FIG. 10 is a detailed view of the scene completion module.

The step of selecting a scene 44 further includes activating the scene follow-up module 98 following the step of de-activating the view scene module 96. Scene follow-up 98, best shown in FIG. 8, is where the majority of the learning happens. It is in this step that the scene's dialogue, which has been sub-subdivided into individual sequences 46, is taught to the student 20 part-by-part. If the student 20 understood one part of the dialogue in the scene 44, but not another, they can simply proceed to the dialog sequence sections 46 that they want to study further. This is represented by the choose sequence box 118 in FIG. 8. Unless the student 20 chooses to skip the remainder of the scene follow-up module 98, thus proceeding directly to the end box 120 in which the scene follow-up module 98 is de-activated, the student will then proceed to the interactive content slide step 122 where the selected scene 44 automatically expands and plays just that part of dialogue segment 46. The selection may be considered a "first" dialog sequence segment 46 sub-subdivided from the scene 44. The step of selecting a first dialog sequence segment includes replaying the video portion of the first dialog sequence 46 on the display screen 24 while simultaneously playing the audio dialog portion in the target language through the audio speaker 26. If so selected by the student 20, target language subtitles 50 are displayed on the display screen 24 generally synchronized with the audio dialog portion played through the audio speaker 26. At any pause in the playback, the literal meaning of at least one word or phrase 52 in the target language subtitle 50 will be made interactive in direct response to movement of the cursor 30 (or other user-initiated action), according to all of the previously described interactive attributes. In addition to the literal meaning of the word 52, the the motion picture is paused and the word 52 is clicked the student 20 will see the phonetic and or a definition or dictionary type presentation corresponding to the word or phrase 52.

After presenting the dialog sequence 46 in full, the computerized system starts breaking down the dialog sequence 46 so that the student 20 can learn to understand it part by part as represented by action box 124. This breakdown process 124 may include any number or variation of techniques which, in the illustrated embodiment, comprises critical thinking 126, grammar 128, cultural notes 130 and quizzes 132. More specifically, screen slides or pages related to critical thinking 126 are designed to help the student 20 build on and adapt what he/she has learned to similar situations, conversations and memory building exercises. The student 20 here is challenged to apply previously learned concepts to create new words or phrases. Screen slides or pages related to grammar 128 reinforce the grammatical lesson by making certain points if slang or explaining key principals or grammar. This might include, but is not limited to, how changing the form of a word alters its meaning grammatically, or its gender, or its grammatical register, its syntax etc., and explain how changing certain elements of a word might shift its tense or other characteristics of relevance to the learning process. Preferably, grammar notes are scattered (and repeated) throughout the dialog sequences 46 to reinforce important grammatical lessons. Screen icons (not shown) may be incorporated into the visual display on screen 24 to indicate when a particular dialog sequence 46 contains either a cultural note 130 or a grammatical note 128 so that the student will be prompted to click on the icon to see the note 128, 130. As mentioned previously, cultural notes 130 are considered an important component of the teaching methodology of this present invention. Cultural notes 130 teach the student 20 about the culture of the target language, make the learning process more engaging and exciting for the student 20. Quizzes 132 are posed immediately or shortly after material has been taught to accommodate the well-known "Forgetting Curve". If a student cannot promptly answer a question posed in a quiz 132, they may be afforded more time or may simply concede defeat and view the answer before moving on. An interactive pop-up feature (not shown) may be programmed to appear directly following a quiz to allow the student to indicate whether or not they guessed correctly (i.e., "I got it/I didn't get it"). This feature allows the student 20 to earn points for their success on quizzes and progress throughout the course. While the awarding of points is largely dependent upon the student 20 being honest with their results, it is a further tool for the student 20 to track their personal language learning progress. The points feature may be configured to tie into a Total Exposure Icon 133 that may appear on the display screen 24, as shown in FIG. 3. The total number of points may be tallied here in four key areas: Vocabulary, Phrases, Grammar, and Culture. For example, when a student 20 indicates "Got It" for correctly answering a particular grammar-based quiz 132 question, they may be awarded 3 addition brain power points (or other predetermined denomination). Over time, the points can be tallied to produce a Total Exposure Score. For example, if a student 20 has completed two chapters and started a third chapter in a motion picture, they may have accumulated 806 out of a possible 2,106 Vocabulary points, 438 out of a possible 867 Phrases points, 28 out of a possible 64 Culture points, and 200 out of a possible 211 Grammar points. In this example, they will have earned a composite index score of 41%, which may be shown also as a pie-chart adjacent the Total Exposure Icon 133. When the student is ready to advance, they proceed to the end box 120, whereupon the scene follow-up module 98 is de-activated.

The scene re-play module 100 may be activated following the step of de-activating the scene follow-up module 98. The scene re-play module 100 comprises, in effect, repeating the view scene module 96 where the student watches the entire scene 44 through so that they can once again hear the all the dialogue that has just been studied in great detail. The scene re-play module 100 is de-activated when the student 20 is finished re-watching the scene 44.

The final scene completion module 102 is activated following the step of de-activating the scene replay module 100. The student 20 is afforded the choice of repeating all of the modules 94-102 for the previously selected/studied scene 44 via decision block 134. If not, the student 20 in effect concludes they are ready to advance to a new scene 44 or chapter 42. Before advancing to a new scene 44, however, the student 20 may wish to share his/her progress on Facebook or Twitter or other suitable social media website. Query box 136 is provided for this purpose. If the student 20 selects "Yes", then they are directed to a program application 138 allows them to choose the particular social media platform(s) and create the desired posting. Finally, the student 20 proceeds to the Next? decision block 84 where they can choose to repeat the selected scene 44 in the modules feature 86, or select a new chapter (selection box 88), select a specific scene 44 to replay (selection box 90) or end the program (decision box 92).

As will be appreciated, this computerized learning system is self-paced. Students 20 are not penalized for a slow pace. If, hypothetically, a student 20 wanted to stay on a selected dialog sequence 46 all day they could. It is considered most important that the student 20 gain a good understanding of the content no matter how long it takes. By this method, the student 20 progresses sequence-by-sequence 46, scene-by-scene 44 and chapter-by-chapter 42 through the entire motion picture. Along the way, students 20 are concurrently stimulated emotionally through the video portion 48 presented on the display screen 24, cognitively through the interactive target 50 and source 58 language subtitles presented in semantic color-mapped format and the grammar notes 128, socially/historically through the culture notes 130, through auditory dialogs and narrations played through the speakers 26, by repetition, by repeated testing (via quizzes 132), through merit awards (points) and through social recognition (query box 136). As a direct result, this invention substantially increases the ease and effectiveness with which a student 20 learns a foreign language through the strategic use of motion pictures and concurrent target language subtitles 50, 58 in a computerized format.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A computer-assisted method for instruction in language skills to train a student competent in a source language to understand a different target language, said method comprising the steps of:

providing a motion picture containing a video portion and a corresponding audio dialog portion in a target language, the motion picture having a playing time, dividing the playing time into a plurality of chapters, sub-dividing a selected chapter into a plurality of scenes including at least a first scene and a second scene, sub-subdividing the first scene into a plurality of dialog sequence segments including at least a first dialog sequence and a second dialog sequence, associating target language subtitles with the motion picture, the target language subtitles being generally synchronized with the audio dialog portion, making at least one word in the target language subtitle interactive with a student in direct response to a selection made on the a display screen, associating source language subtitles with the motion picture, the source language subtitles generally synchronized with the audio dialog portion, presenting the selected chapter of the motion picture on the display screen and playing the corresponding audio dialog portion in the target language through an audio speaker, said step of presenting the selected chapter including selecting the first scene within the selected chapter, and then for the first scene performing the steps of:

activating a scene preparation module, said step of activating the scene preparation module comprising displaying on the display screen a plurality of target language vocabulary words contained within the target language subtitles in the first scene, at least one of the target language vocabulary words being electronically interactive in direct response to a selection made on the display screen, and de-activating the scene preparation module, activating a view scene module following said step of de-activating the scene preparation module, said step of activating the view scene module comprising presenting the entire first scene of the selected chapter of the motion picture on the display screen and playing the corresponding audio dialog portion in the target language through the audio speaker, and then de-activating the view scene module, activating a scene follow-up module following said step of de-activating the view scene module, said step of activating the scene follow-up module including selecting the first dialog sequence segment sub-subdivided from the first scene, said step of selecting the first dialog sequence segment including replaying the first dialog sequence of the first scene of the selected chapter of the motion picture on the display screen and playing the corresponding audio dialog portion in the target language through the audio speaker, said step of replaying the first dialog sequence further including displaying on the display screen the target language subtitle, at least one of the words in the target language subtitle being electronically interactive in direct response to a selection made on the display screen, selecting the second dialog sequence segment sub-subdivided from the first scene, said step of selecting the second dialog sequence segment including replaying the second dialog sequence of the first scene of the selected chapter of the motion picture on the display screen and playing the corresponding audio dialog portion in the target language through the audio speaker, said step of replaying the second dialog sequence further including displaying on the display screen the target language subtitle, at least one of the words in the target language subtitle being electronically interactive in direct response to a selection made on the display screen, and then de-activating the scene follow-up module.

2. The method of claim 1 further including the step of displaying on the display screen the source language subtitles concurrently with said steps of displaying on the display screen the target language subtitles, and semantically color-mapping the target language subtitles to the source language subtitles, said semantic color-mapping step including displaying at least one word in the target language subtitle in a distinctive color relative to the color of all other words in the target language subtitle and displaying the corresponding word or words in the source language subtitle in the same distinctive color.

3. The method of claim 1 wherein said step of being electronically interactive includes at least one of: displaying on the display screen a source language phonetic equivalent of the target language subtitle word and playing through the audio speaker a sound recording of a human voice articulating the target language subtitle word and presenting on the display screen the meaning of the target language subtitle word in the source language.

4. The method of claim 1 wherein said step of replaying the first dialog sequence includes displaying on the display screen in the source language the literal meaning of at least one word or phrase in the target language subtitle in direct response to a selection made on the display screen.

5. The method of claim 1 wherein said step of replaying the first dialog sequence includes posing a query to the student on the display screen based on at least one word in the target language subtitle.

6. The method of claim 1 wherein said step of replaying the first dialog sequence includes displaying on the display screen in the source language at least one grammar fact in the source language for at least one word or phrase in the target language subtitle in direct response to a selection made on the display screen.

7. The method of claim 1 wherein said step of replaying the first dialog sequence includes posing a query on the display screen based on at least one word in the target language subtitle in combination with one word not in the target language subtitle.

8. The method of claim 1 wherein said step of replaying the first dialog sequence includes displaying on the display screen a cultural note pertaining to content in the specific dialog sequence written in the source language.

9. The method of claim 1 wherein said step of selecting the first scene further includes activating a scene re-play module following said step of de-activating the scene follow-up module, said step of activating the scene re-play module comprising re-presenting the entire scene of the selected chapter of the motion picture on the display screen and playing the corresponding audio dialog portion in the target language through the audio speaker, and then de-activating the scene re-play module.

10. The method of claim 9 wherein said step of selecting the first scene further includes activating a scene completion module following said step of de-activating the scene replay module, said step of activating the scene completion module including at least one of repeating said step of presenting the selected chapter and presenting a different chapter in the motion picture.

11. The method of claim 10 wherein said step of activating the scene completion module includes posting a progress message on a social media internet website.

12. The method of claim 10 further including deactivating said scene completion module and then selecting the second scene within the selected chapter, and then for the second selected scene repeating said steps of activating the scene preparation module and the view scene module and the scene follow-up module and the scene re-play module and the scene completion module.

13. The method of claim 1 wherein said step of making at least one word in the target language subtitle interactive includes providing cursor-activated additional information for the at least one word in the subtitle, the additional information including at least one of a phonetic pop-up in the target language and an audio voice recording of the word and a translation of the word into the source language and the word case and the word formality and the word gender and the register politeness and the number of people speaking.

14. The method of claim 1 wherein said step of activating the scene preparation module includes displaying on the display screen at least one still shot image capture from the first scene.

15. A computer-assisted system for instruction in language skills to train a student fluent in a source language to understand a different target language, said system comprising:
  a graphic user interface including a display screen and an audio speaker,
  a non-transitory computer readable medium operatively associated with said graphic user interface,
  a motion picture containing a video portion and a corresponding audio dialog portion in a target language stored in said non-transitory computer-readable medium, the motion picture having a playing time divided into a plurality of chapters, a selected chapter subdivided into a plurality of scenes including at least a first scene and a second scene, the first scene subsubdivided into a plurality of dialog sequence segments including at least a first dialog sequence and a second dialog sequence,
  said non-transitory computer readable medium coded with instructions to perform the following steps when executed by a processor:
  associating target language subtitles with the motion picture, the target language subtitles being generally synchronized with the audio dialog portion, making at least one word in the target language subtitle interactive with a student in direct response to a selection made on the display screen,
  associating source language subtitles with the motion picture, the source language subtitles generally synchronized with the audio dialog portion,
  presenting at least one the selected chapter of the motion picture on the display screen and playing the corresponding audio dialog portion in the target language through the audio speaker,
  said step of presenting the selected chapter including selecting a the first scene within the selected chapter, and then for the first selected scene performing the steps of:
  activating a scene preparation module, said step of activating the scene preparation module comprising displaying on the display screen a plurality of target language vocabulary words from the first scene, at least one of the target language vocabulary words being electronically interactive in direct response to a selection made on the display screen, and deactivating the scene preparation module,
  activating a view scene module following said step of de-activating the scene preparation module, said step of activating the view scene module comprising presenting the entire first scene of the selected chapter of the motion picture on the display screen and playing the corresponding audio dialog portion in the target language through the audio speaker, and then de-activating the view scene module,
  activating a scene follow-up module following said step of de-activating the view scene module, said step of activating the scene follow-up module including selecting the first dialog sequence segment sub-subdivided from the first scene, said step of selecting the first dialog sequence segment including replaying the first dialog sequence of the scene of the selected chapter of the motion picture on the display screen and playing the corresponding audio dialog portion in the target language through the audio speaker, said step of replaying the first dialog sequence further including displaying on the display screen the target language subtitle, at least one of the words in the target language subtitle being electronically interactive in direct response to a selection made on the display screen, selecting the second dialog sequence segment sub-subdivided from the scene, said step of selecting the second dialog sequence segment including replaying the second dialog sequence of the scene of the selected chapter of the motion picture on the display screen and playing the corresponding audio dialog portion in the target language through the audio speaker, said step of replaying the second dialog sequence further including displaying on the display screen the target language subtitle, at least one of the words in the target language subtitle being electronically interactive in direct response to a selection made on the display screen, and then de-activating the scene follow-up module.

* * * * *